(12) United States Patent
Nakamura

(10) Patent No.: US 8,378,792 B2
(45) Date of Patent: Feb. 19, 2013

(54) ELECTRONIC INFORMATION DEVICE AND CONTROL METHOD THEREFOR

(75) Inventor: Toshiaki Nakamura, Yokohama (JP)

(73) Assignee: Kyocera Corporation, Kyoto (JP)

( * ) Notice: Subject to any disclaimer, the term of this patent is extended or adjusted under 35 U.S.C. 154(b) by 235 days.

(21) Appl. No.: 12/745,232

(22) PCT Filed: Nov. 28, 2008

(86) PCT No.: PCT/JP2008/071707
§ 371 (c)(1),
(2), (4) Date: Oct. 28, 2010

(87) PCT Pub. No.: WO2009/069775
PCT Pub. Date: Jun. 4, 2009

(65) Prior Publication Data
US 2011/0032084 A1 Feb. 10, 2011

(30) Foreign Application Priority Data
Nov. 28, 2007 (JP) ................. 2007-307717

(51) Int. Cl.
*G08B 1/00* (2006.01)
(52) U.S. Cl. ................ 340/309.9; 340/686.1; 455/575.3
(58) Field of Classification Search ............... 340/309.9, 340/686.1, 687; 455/575.1, 575.3
See application file for complete search history.

(56) References Cited

U.S. PATENT DOCUMENTS

| 6,453,169 | B1 * | 9/2002 | Maloney | 455/575.1 |
| 7,937,122 | B2 * | 5/2011 | Hamamura et al. | 455/575.1 |

FOREIGN PATENT DOCUMENTS

| JP | 2003-283649 | 10/2003 |
| JP | 2004-343677 | 12/2004 |
| JP | 2007-181235 | 7/2007 |
| JP | 2007-215221 | 8/2007 |

OTHER PUBLICATIONS

International Search Report for PCT/JP2008/071707, mailed on Mar. 3, 2009, 1 page.
JP 2007-307717 Office Action mailed Dec. 4, 2012.

* cited by examiner

*Primary Examiner* — Toan N Pham
(74) *Attorney, Agent, or Firm* — Duane Morris LLP

(57) ABSTRACT

An electronic information device of the present invention includes: two main body members that are coupled to each other to be capable of transitioning from a first state to a second state; a detecting section that detects whether the two main body members are in either state of the first state or the second state; a time counting section that counts a first time that is required for the two main body members to transition from the first state to the second state; and a function restricting section that restricts at least one function operation in accordance with the first time.

12 Claims, 4 Drawing Sheets

FIG. 4

| TIME T1(s) | 0~1 | 1~2 | 2~4 | 4~8 | ... |
|---|---|---|---|---|---|
| TIME T2(s) | 0 (IMMEDIATELY) | 5 | 10 | 20 | ... |

ELECTRONIC INFORMATION DEVICE AND CONTROL METHOD THEREFOR

CROSS-REFERENCE TO RELATED APPLICATIONS

This is a U.S. National Phase Application of International Patent Application No. PCT/JP2008/071707 filed Nov. 28, 2008, which claims priority to Japanese Patent Application No. 2007-307717 filed Nov. 28, 2007, the disclosures of which are incorporated herein by reference in their entirety.

TECHNICAL FIELD

The present invention relates to an electronic information control device and a control method therefor.

BACKGROUND ART

In recent years, advanced features such as a large capacity telephone number registration function and an e-mail sending and receiving function have rapidly progressed in electronic information devices such as mobile telephones from the aspect of an improvement in performance. However, along with this increase in performance, personal information including of a private nature such as names and telephone numbers of people and e-mail addresses has come to be saved in large quantities in the memory of mobile telephones. Since such large quantities of personal information being improperly used by third parties leads to problems involving privacy, a means is needed to prevent impropriety by third parties.

As a means to prevent improper use by third parties other than the possessor, conventional mobile telephones have been provided with a dial lock function. A conventional dial lock function has a function that, after detecting the opening or closing of the mobile telephone, locks the dialing based on setting information that is stored in advance, and moreover has a function that sets the time and time duration of the dial lock by using a timer or time counting function (for example, refer to Patent Document 1).

[Patent Document 1] Japanese Unexamined Patent Application, First Publication No. 2004-343677

DISCLOSURE OF INVENTION

Problem to be Solved by the Invention

However, in this dial lock function as described above, the time until the dial locked after closing the mobile telephone and the time period during dial lock are fixed by the time that is set in advance. For that reason, upon closing the mobile telephone, when a fixed time has elapsed the dial lock is always done. In this way, the time, once set, cannot be changed unless the user resets the settings by an operation from the input operation section. For that reason, there has been the problem of dial lock not being done when it is desired to be locked, and dial lock being done when it is not desired to be locked.

For example, because of the user's convenience, there are times of wanting to have dial lock applied immediately after closing the mobile telephone, and times of wanting to have the dial lock applied after some time has elapsed. In such cases, since the user must change the setting each and every time, the convenience is not good. Due to the hassle of such settings, forgetting to perform the setting often occurs.

Due to the risk of a drop in operability, there are also many users who do not use the dial lock function.

The present invention has been achieved in view of the above-mentioned problems of the conventional art, and an object thereof is to provide an electronic information device and a control method therefor that simplifies the setting of the time until restricting functions of an electronic information device, and maintains the operation convenience at a high level.

Means for Solving the Problem

An electronic information device of the present invention includes: two main body members that are coupled to each other to be capable of transitioning from a first state to a second state; a detecting section that detects whether the two main body members are in either state of the first state or the second state; a time counting section that counts a first time that is required for the two main body members to transition from the first state to the second state; and a function restricting section that restricts at least one function operation in accordance with the first time.

In the electronic information device of the present invention, it is preferable that the function restricting section restrict the function operation after the two main body members are set to the second state.

In the electronic information device of the present invention, it is preferable that the function restricting section set a second time that corresponds to the first time, and the function restricting section restrict the function operation when the second time is elapsed from when the two main body members are transitioned to the second state.

In the electronic information device of the present invention, it is preferable that the function restricting section restrict the function operation when the second state is maintained during a period until the second time is elapsed after the transition of the two main body members to the second state.

In the electronic information device of the present invention, it is preferable that the two main body members transition from an opened state in which the two main body members are mutually unfolded, which is the first state, to a closed state in which the two main body members are mutually opposed, which is the second state.

In the electronic information device of the present invention, it is preferable that the function restricting section invalidate an input operation other than a cancellation input operation for canceling restriction of the function operation, and cancel the restriction of the function operation in a case of the cancellation input operation being detected.

A control method for an electronic information device of the present invention includes: a time counting step of counting a first time that is required for two main body members of an electronic information device to transition from a first state to a second state, the electronic information device having two main body members coupled to each other; and a function restricting step of restricting at least one function operation of the electronic information device in accordance with the first time.

In the control method for an electronic information device of the present invention, it is preferable that the function restricting step restrict the function operation after the two main body members are set to the second state.

In the control method for an electronic information device of the present invention, it is preferable that the function restricting step set a second time that corresponds to the first time, and the function restricting step restrict the function operation when the second time is elapsed from when the two main body members are transitioned to the second state.

In the control method for an electronic information device of the present invention, it is preferable that the function restricting step restrict the function operation when the second state is maintained during a period until the second time is elapsed after the transition of the two main body members to the second state.

In the control method for an electronic information device of the present invention, it is preferable that the time counting step count the first time that is required to transition from an opened state in which the two main body members are mutually unfolded, which is the first state, to a closed state in which the two main body members are mutually opposed, which is the second state.

In the control method for an electronic information device of the present invention, it is preferable that the function restricting step invalidate an input operation other than a cancellation input operation for canceling restriction of the function operation, and the function restricting step cancel the restriction of the function operation in a case of the cancellation input operation being detected.

EFFECT OF THE INVENTION

According to the present invention, it is possible to restrict at least one function of an electronic information device in accordance with the time that is required to transition the electronic information device from a first state (opened state) to a second state (closed state). According to an embodiment of the present invention, it is possible to freely adjust at the user's convenience the time until it is possible to restrict at least one function of this electronic information device. Thereby, since it is possible to perform a desired function restriction when necessary, user-friendliness improves. Also, since it is possible to determine the time until the function restriction just by performing the operation of making the electronic information device transition from the first state to the second state, operability improves, and it is possible to more effectively perform restriction of a function.

BRIEF DESCRIPTION OF THE DRAWINGS

FIG. 4 shows a relationship of a time T1 and a time T2 of the mobile telephone in the present embodiment.

REFERENCE SYMBOLS

100: Mobile telephone (Electronic information device)
1: First housing (Main body member)
2: Second housing (Main body member)
100A: Mobile telephone main body (Electronic information device main body)
5: Key input section (Input operation section)
24: Opened-closed detection sensor (Detecting section)
T1: Time required for transforming from the closed state to the opened state (First time)
T2: Dial lock timer (Time until the dial lock is applied after the closed state is detected: Second time)

BEST MODE FOR CARRYING OUT THE INVENTION

Hereinbelow, an embodiment of the present invention shall be described with reference to the drawings. Unless expressly stated otherwise, the dimensions, materials, shapes and relative positioning of the constituent elements that are disclosed in this embodiment are intended for purposes of illustration only and are not intended to limit the scope of the invention thereto.

Figure 1A:
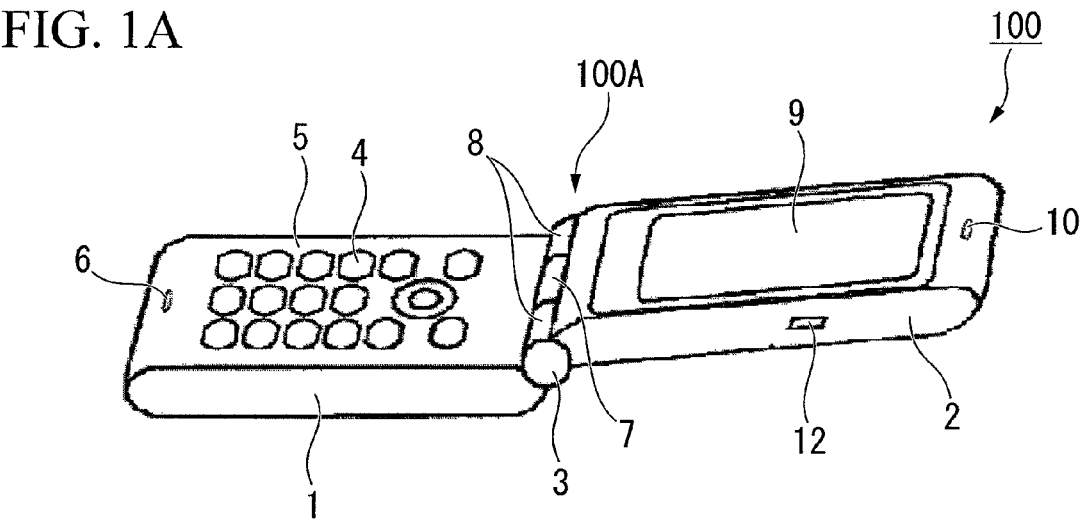
FIG. 1A is a perspective view that describes the overall constitution of a mobile telephone in a present embodiment, and shows a state during use of the mobile telephone (opened state).
Figure 1B:
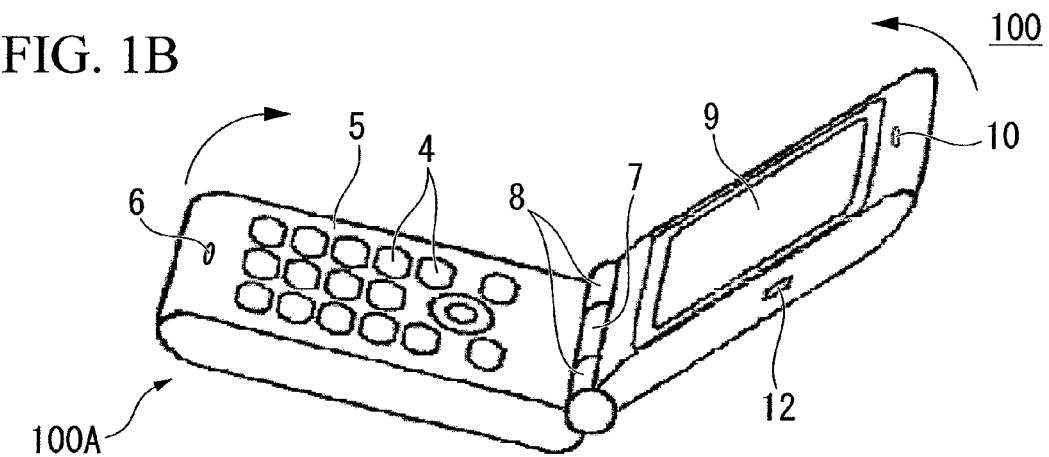
FIG. 1B is a perspective view that describes the overall constitution of the mobile telephone in the present embodiment, and shows a state midway in transition from a opened state to a closed state.
Figure 1C:
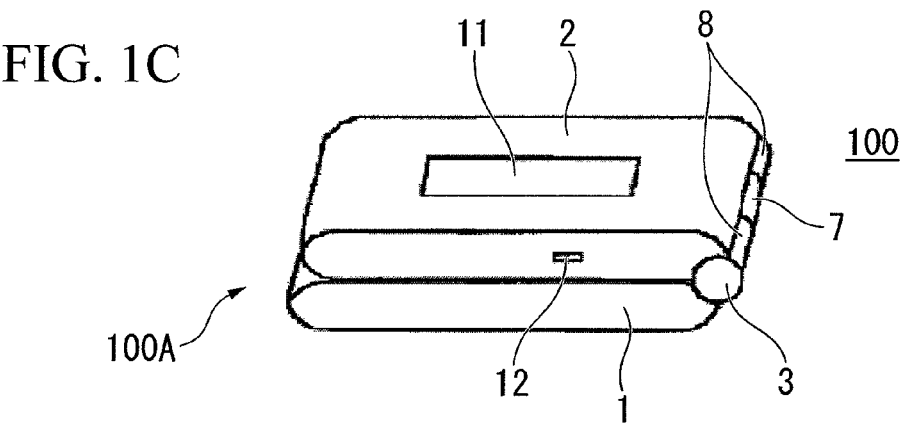
FIG. 1C is a perspective view that describes the overall constitution of the mobile telephone in the present embodiment, and shows a state when stored (closed state).

FIGS. 1A to 1C are views that explain the overall constitution of a mobile telephone according to a present embodiment. FIG. 1A is a perspective view that shows the state during use of the mobile telephone (opened state). FIG. 1B is a perspective view that shows the state midway in the transition from the opened state to the closed state. FIG. 1C is a perspective view that shows the state when stored (closed state).

A mobile telephone 100 has a mobile telephone main body 100A (electronic information device main body) in which a first housing 1 (main body member) and a second housing 2 (main body member) are coupled by a hinge 3. The first housing 1 has a key input section 5 (input operation section) on one surface. The second housing 2 has a screen display section 9 on one surface. The mobile telephone 100 is folded and stored in a state in which the mutual housings 1 and 2 are overlapped with the screen display section 9 and the key input section 5 facing each other. The mobile telephone 100 is normally used in the opened form as shown in FIG. 1A.

The hinge 3 has a bulging section 7 that is projected at the end section of the second housing 2, and a pair of bearing sections 8 that are formed at the end section of the first housing 1. This bulging section 7 is interposed between the pair of bearing sections 8. The hinge 3 couples the first housing 1 and the second housing 2 in a freely rotatable manner by a hinge pin not illustrated that straddles both bearing sections 8 and the bulging section 7. As shown in FIG. 1A, the state of the angle formed by the first housing 1 and the second housing 2 approaching 180° serves as the operation state (opened state: first state). As shown in FIG. 1C, the state of the angle formed by the first housing 1 and the second housing 2 being approximately 0° serves as the folded state (closed state: second state). The angle formed by the first housing 1 and the second housing 2 during the opened state is not limited to this.

A transmission microphone 6 is provided on the inner surface of the first housing 1 (the surface that overlaps with the second housing 2) in the vicinity of the end section at the opposite side of the hinge 3. The key input section 5 includes a plurality of operation keys 4 that allow pressing operation such as a call key, an end key, and numeric keys.

A receiving speaker 10 is provided on the inner surface of the second housing 2 (the surface that overlaps with the second housing 1) in the vicinity of the end section at the opposite side of the hinge 3. A sub display section 11 is provided on the outer surface of the second housing 2, that is, the surface that is exposed to the outside in the state of the mobile telephone 100 being closed. The present time, date and the like are displayed in this sub display section 11. Moreover, in the present embodiment, the key lock state or lock cancellation state, which are described below, are displayed in this sub display section 11.

Moreover, a side key 12 is provided on a side surface of the second housing 2. This side key 12 is provided at a position that is exposed on the outer surface even when the mobile telephone 100 is in the closed state. This side key 12 is used for example when answering a call and answer holding, up and down selection and confirmation processes on a selection screen during use, and moreover for selection of various functions of the mobile telephone 100.

Figure 2:
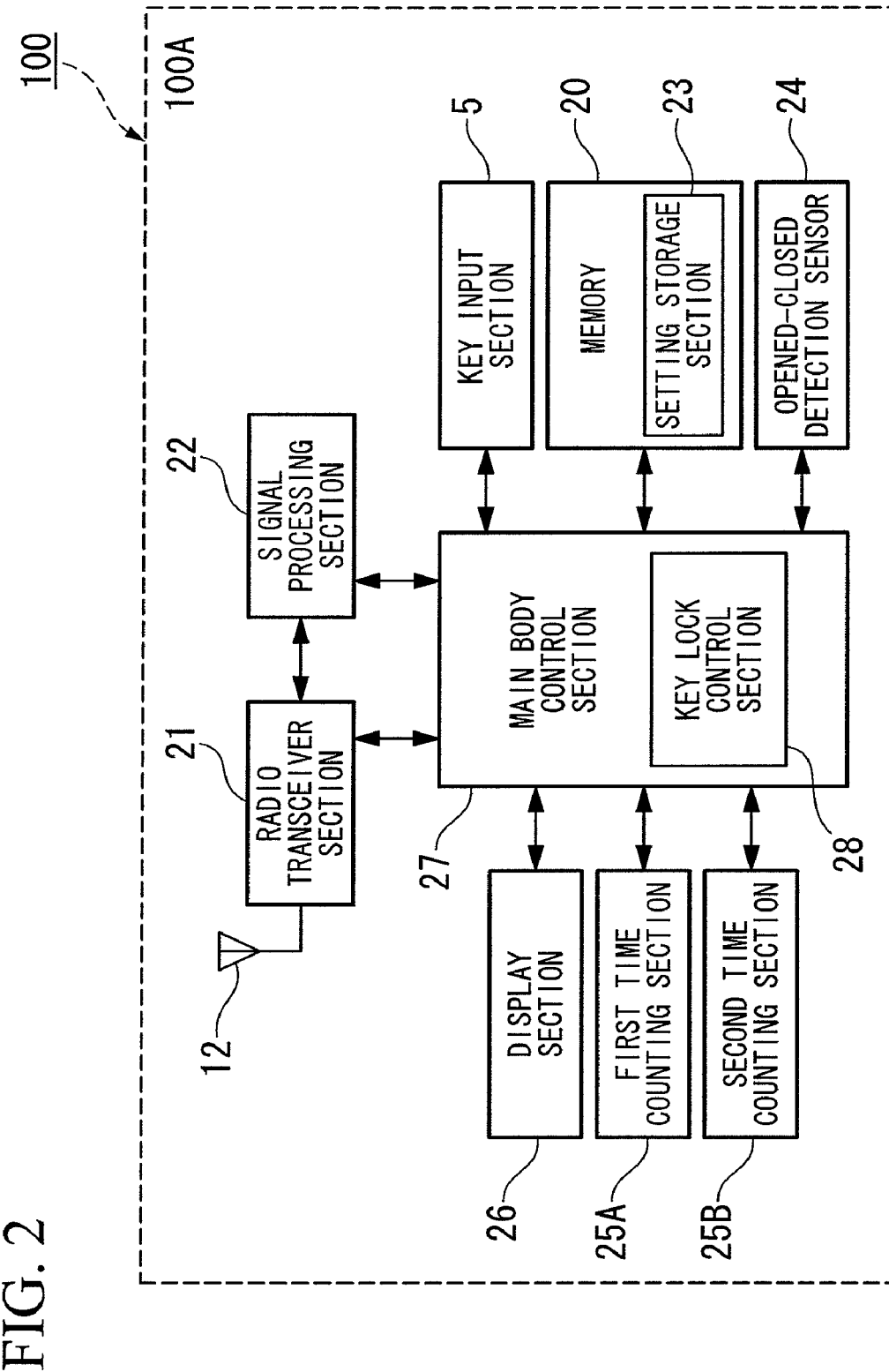
FIG. 2 is a block diagram of the mobile telephone in the present embodiment.

FIG. 2 is a block diagram of the mobile telephone according to the embodiment of the present invention. In FIG. 2, the same reference symbols are given to members corresponding to the members shown in FIGS. 1A to 1C.

As shown in FIG. 2, the mobile telephone 100 of the present embodiment includes the key input section 5, a display section 26, a memory 20, a radio transceiver section 21, a signal processing section 22, a setting storage section 23, an opened-closed detection sensor 24, a first time counting section 25A, a second time counting section 25B, a main body control section 27, and a key lock control section 28.

The main body control section 27 has a function that controls main operations such as various function settings of the mobile telephone 100 by controlling each section of the mobile telephone 100 shown in FIGS. 1A to 1C. The radio transceiver section 21, the signal processing section 22, the key input section 5, the memory 20, the display section 26, the opened-closed detection sensor 24, the first time counting section 25A, and the second time counting section 25B are connected to the main body control section 27. The radio transceiver section 21 performs transmission and reception with another device that includes a call function. The signal processing section 22 processes voice information at the time of answering a call. The memory 20 stores various control programs. The display section 26 includes the screen display section 9 and the sub display section 11 that is constituted by a liquid crystal display. The key input section 5 receives the input of commands to the aforementioned sections.

The display section 26 displays to the screen display section 9 in accordance with the processing of the main body control section 27 based on the operation of the key input section 5, when the mobile telephone 100 is in the opened state. The display section 26 may also display to the sub display section 11.

The opened-closed detection sensor 24 detects the opened or closed state of the mobile telephone 100. The opened-closed detection sensor 24 detects whether the first housing 1 and the second housing 2 are in an opened state (FIG. 1A) or a closed state (FIG. 1C). As the opened-closed detection sensor 24, it is possible to adopt a sensor of various shapes. As the opened-closed detection sensor 24, there is, for example, a sensor that detects the opened-closed state of the first housing 1 and the second housing 2 by a pair of switches that respectively detect the opened state or the closed state (press switch, optical switch, magnetic sensor, or the like), or a variable resistor. This opened-closed detection sensor 24 may be provided in the vicinity of the hinge 3, or the surface side of the first housing 1 or the second housing 2 at which they face each other, or may be provided at another section.

The first time counting section 25A measures the time of the mobile telephone 100 being transformed from the opened state to the closed state. The second time counting section 25B measures the time from when the closed state of the mobile telephone 100 is cancelled to when the dial lock is activated.

The memory 20 has a setting storage section 23 that stores control information used by the key lock control section 28. This setting storage section 23, for example, stores a setting that enables change of the time from when the closed state is detected to when the dial lock is activated in accordance with the time that is detected by the first time counting section 25A, and information related to the function (application) that is restricted during the dial lock, and the password information set by the user for canceling the dial lock.

The main body control section 27 includes the key lock control section 28 that has a function that restricts a section of the functions of the mobile telephone 100. This key lock control section 28 detects the opened state or the closed state of the mobile telephone 100 based on the output from the opened-closed detection sensor 24. Moreover, the key lock control section 28 determines the time that is counted in the second time counting section 25B in accordance with the output from the first time counting section 25A (the time until dial lock). The key lock control section 28 executes the dial lock process in the case of the time counting in the second time counting section 25B having ended. The key lock control section 28 prohibits predetermined functions during dial lock, for example operations other than answering calls, and invalidates inputs other than at least the password for cancelling the dial lock among operations of the operation keys 4 by the user.

(Dial Lock Method)

Figure 3:
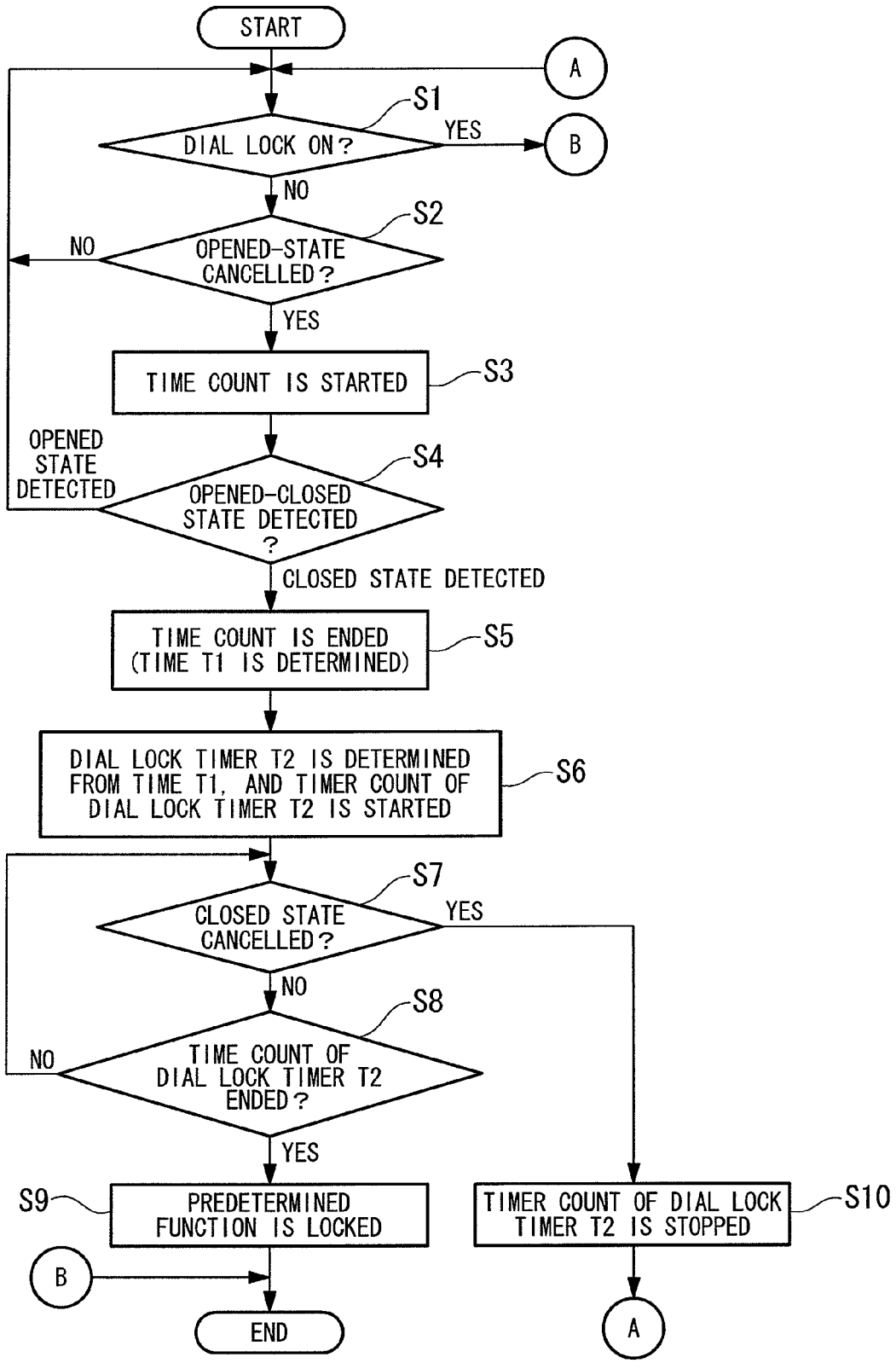
FIG. 3 is a flowchart that shows a setting process of a dial lock function of the mobile telephone in the present embodiment.

FIG. 3 is a flowchart that shows the setting process of the dial lock function according to the present embodiment.

Also, FIG. 4 shows an example of the relationship of the time required to close the mobile telephone and the time from when it is closed to when the dial lock is implemented.

The process according to the flowchart shown in FIG. 3 is started when the mobile telephone 100 is put in the opened state.

First, it is judged whether or not the mobile telephone 100 that has been put in the opened state has been dial locked (Step S1).

In Step S1, it is confirmed whether or not the dial lock process by the key lock control section 28 is being executed (dial lock in effect). In the case of the determination result being "NO", that is, in the case of the dial lock not being in effect, the processing goes on standby until the next operation by the user. On the other hand, in the case of the determination result being "YES", that is, in the case of the dial lock being currently implemented, the processing proceeds to "B" and the processing ends. Next, the dial lock continues as is or an operation is performed to cancel the dial lock. The operation flow for cancelling the dial lock is described below.

When the dial lock is not currently in effect, in the case of the user starting to close the mobile telephone 100, the key lock control section 28 detects that the opened state of the mobile telephone 100 has been cancelled by the output from the opened-closed detection sensor 24 (Step S2).

In Step S2, in the case of the determination result by the key lock control section 28 being "YES", that is, when it is confirmed that the opened state of the mobile telephone 100 has been cancelled, the first time counting section 25A starts the time count (Step S3). The first time counting section 25A counts the passage of time from the point in time of the opened state of the mobile telephone 100 being cancelled until detection of the closed state. During counting, the key lock control section 28 monitors the opened or closed state of the mobile telephone 100 by the opened-closed detection sensor 24. When the key lock control section 28 detects the closed state of the mobile telephone 100 by receiving the output from the opened-closed detection sensor 24 (Step S4), the first time counting section 25A ends the time count (Step S5). The key lock control section 28 detects the time T1 required for displacement of the mobile telephone 100 from the opened state to the closed state by the output of the count start and count end from the first time counting section 25A.

On the other hand, in the case of the key lock control section 28 detecting the opened state by the output from the opened-closed detection sensor 24 in response to the user again opening the mobile telephone 100 during the time count in the first time counting section 25A, the first time counting section 25A resets the time count and the processing moves to "A".

Next, the key lock control section 28 determines the dial lock timer T2 with the time T1 that was detected by the aforementioned first time counting section 25A based on the condition set in advance by the user (Step S6). The dial lock timer T2 is the time from when the mobile telephone 100 is put in the closed state to when the dial lock process is executed. Hereinbelow, the dial lock timer T2 is sometimes referred to as time T2.

The user in advance performs a setting such as making the dial lock timer T2 a time that is some multiple of the time T1, whereby the dial lock timer T2 is calculated. For example, in the case of the time T1 required for transitioning from the opened state to the closed state being 10 seconds, a setting is performed so as to fix the time T2 from the closed state being detected to the dial lock being activated to 10 minutes, which is 60 times.

For example, it is preferable to prepare in advance a table showing the relationship between the time T1 and the time T2 as shown in FIG. 4. For example, in the case of the user setting the relationship of time T1 and time T2 as shown in the table of FIG. 4, the dial lock is activated in the following manner. In the case of the time T1 detected by the first time counting section 25A being 0 to 1 seconds, the key lock control section 28 activates the dial lock immediately (time T2=0 seconds) from the point in time of detecting the closed state of the mobile telephone 100. In the case of the time T1 being 1 to 2 seconds, the key lock control section 28 activates the dial lock 5 seconds (time T2=5 seconds) after detecting the closed state of the mobile telephone 100. In this way, the user can set the relationship between the time T1 and the time T2 as desired.

Also, in the present step, the key lock control section 28 causes the second time counting section 25B to start a subtraction count of the dial lock timer T2.

During the countdown until executing the dial lock process, the key lock control section 28 monitors the opened or closed state of the mobile telephone 100 with the opened-closed detection sensor 24 (Step S7). In the event of the subtraction count of the dial lock timer T2 ending (time T2=0: time up) with the closed state of the mobile telephone 100 being maintained as is (that is, the cancellation of the closed state not being detected), that is, in the event of a predetermined time (time T2) having elapsed with the closed state being maintained (Step S8), the key lock control section 28 executes the dial lock process based on the condition set in advance by the user.

On the other hand, during the subtraction count of the dial lock timer T2, when the closed state of the mobile telephone 100 is cancelled, that is, when the opened-closed detection sensor 24 detects the opened state, the determination result of the key lock control section 28 is set to "YES" (Step S7), and the second time counting section 25B stops the countdown of the dial lock timer T2 (Step S10). Then, the processing returns to "A".

In the present embodiment, the dial lock timer T2 is subtraction counted, but it may also be addition counted.

(Dial Lock Cancellation Method)

Next, the cancellation process of the dial lock function shall be described.

When the mobile telephone 100 has been put in the opened state by the user, in the case of the mobile telephone 100 being dial locked (Step S1 of FIG. 3), the key lock control section 28 waits for the password input operation from the user. When the number has been input by the input operation from the operation keys 4, the key lock control section 28 determines whether it matches the password that has been set in advance. In the case of the inputted number matching the password that has been set in advance, that is, when the correct password has been input, the key lock control section 28 cancels the dial lock.

As stated above, the user can freely adjust the time until the dial lock is applied after closing the mobile telephone 100, by means of the time required to close the mobile telephone 100. That is, by causing the time of the dial lock timer T2 to differ in accordance with the detection result of the first time counting section 25A, the convenience of the mobile telephone 100 is improved since it is possible to activate the dial lock when required. For example, in the case of the user not using the mobile telephone 100 for a while, instantaneous locking is possible by closing the mobile telephone 100 quickly, and so it is possible to improve the security aspect. Also, if the user takes time to slowly perform a closing operation, it is convenient in the case that the user is going to redial after a few minutes.

Also, according to the present embodiment, the user can decide the time until activating the dial lock simply by performing the operation of closing the mobile telephone 100. For that reason, since it is not necessary to perform an input operation in each case as in the conventional manner, the operability of the mobile telephone is improved and the usability is good.

In this way, the present embodiment is designed to be able to select at which timing the dial lock is performed at the user's convenience after using the mobile telephone. For that reason, it is possible to enhance the operability and security of a mobile telephone and it is possible to provide a mobile telephone 100 that caters to the type of usage of the user.

Hereinabove, a preferred embodiment of the present invention has been described with reference to the appended drawings, the present invention is not limited to this particular example. The above embodiments may be combined. It is clear that a person skilled in the art can conceive various modifications and variations within the scope of the technical ideal disclosed in the claims, and they are understood to naturally belong to the technical scope of the present invention.

For example, the present embodiment has been described with a folding-type mobile telephone as shown in FIGS. 1A to 1C serving as an example of the electronic information device, but is not limited thereto. It is also possible to apply the present invention to a rotating-type mobile telephone in which the first housing and the second housing are coupled by a hinge and perform a rotation operation, and to a sliding-type mobile telephone in which the first housing and the second housing perform a sliding operation by a heart-shaped cam mechanism, etc. In the case of a rotating-type mobile telephone, the state in which the first housing and the second housing overlap in the thickness direction serves as the closed state of being stored, and the state of one housing being having been rotated in one direction with respect to the other housing along a mutually overlapping surface serves as the opened state of being unfolded. In the case of the sliding-type mobile telephone, the state in which the first housing and the second housing overlap in the thickness direction serves as the closed state of being stored, and the state in which one housing has been slid with respect to the other housing along the mutually overlapping surface serves as the opened state of being unfolded.

Also, it can be applied to a flip-type mobile telephone in which a lid is coupled to a housing. In this case, the opened or closed state of the lid with respect to the housing is detected.

Moreover, the present invention may be an electronic information device that has at least two coupled main body members.

Also, the aforementioned embodiment has restricted some input operations in the key input section 5, but it is also possible to restrict only some functions and applications such as perusal of the telephone directory and e-mail.

Also, in the aforementioned embodiment, the description has been given for the example of determining the time from when the mobile telephone is closed to when the dial lock process is executed in accordance with the time T1 detected by the first time counting section, but the present invention is not limited to this example.

For example, the main body control section may determine the application to serve as the target of the operation restriction based on the time T1. That is, for example, if the time T1 is equal to or less than a predetermined time, the behavior of all applications other than answering incoming calls is prohibited, and if the time T1 exceeds the predetermined time, the behavior of answering incoming calls and applications currently running are not restricted, and the behavior of applications other than those may be restricted.

INDUSTRIAL APPLICABILITY

The control method of the present invention can be applied to an electronic information device. According to this control method, it is possible to simplify the setting of the time until restricting functions of an electronic information device, and maintain the operation convenience at a high level.

The invention claimed is:

1. An electronic information device comprising:
two main body members that are coupled to each other to be capable of transitioning from a first state to a second state;
a detecting section that detects whether the two main body members are in either state of the first state or the second state;
a time counting section that counts a first time that is required for the two main body members to transition from the first state to the second state; and
a function restricting section that restricts at least one function operation in accordance with the first time.

2. The electronic information device according to claim 1, wherein the function restricting section restricts the function operation after the two main body members are set to the second state.

3. The electronic information device according to claim 2, wherein the function restricting section sets a second time that corresponds to the first time, and the function restricting section restricts the function operation when the second time is elapsed from when the two main body members are transitioned to the second state.

4. The electronic information device according to claim 3, wherein the function restricting section restricts the function operation when the second state is maintained during a period until the second time is elapsed after the transition of the two main body members to the second state.

5. The electronic information device according to claim 1, wherein the two main body members transition from an opened state in which the two main body members are mutually unfolded, which is the first state, to a closed state in which the two main body members are mutually opposed, which is the second state.

6. The electronic information device according to claim 1, wherein the function restricting section invalidates an input operation other than a cancellation input operation for canceling restriction of the function operation, and cancels the restriction of the function operation in a case of the cancellation input operation being detected.

7. A control method for an electronic information device, the method comprising:
a time counting step of counting a first time that is required for two main body members of an electronic information device to transition from a first state to a second state, the electronic information device having two main body members coupled to each other; and
a function restricting step of restricting at least one function operation of the electronic information device in accordance with the first time.

8. The control method for an electronic information device according to claim 7, wherein the function restricting step restricts the function operation after the two main body members are set to the second state.

9. The control method for an electronic information device according to claim 8, wherein the function restricting step sets a second time that corresponds to the first time, and the function restricting step restricts the function operation when the second time is elapsed from when the two main body members are transitioned to the second state.

10. The control method for an electronic information device according to claim 9, wherein the function restricting step restricts the function operation when the second state is maintained during a period until the second time is elapsed after the transition of the two main body members to the second state.

11. The control method for an electronic information device according to claim 7, wherein the time counting step counts the first time that is required to transition from an opened state in which the two main body members are mutually unfolded, which is the first state, to a closed state in which the two main body members are mutually opposed, which is the second state.

12. The control method for an electronic information device according to claim 7, wherein the function restricting step invalidates an input operation other than a cancellation input operation for canceling restriction of the function operation, and the function restricting step cancels the restriction of the function operation in a case of the cancellation input operation being detected.

* * * * *